United States Patent [19]

Rooks

[11] 4,167,501

[45] Sep. 11, 1979

[54] PROCESS FOR PREPARING A TEXTILE-TREATING COMPOSITION AND RESIN-SILICONE COMPOSITIONS THEREFOR

[75] Inventor: Robert J. Rooks, Jamestown, N.C.

[73] Assignee: Dow Corning Corporation, Midland, Mich.

[21] Appl. No.: 895,827

[22] Filed: Apr. 13, 1978

[51] Int. Cl.$^2$ .................. C08L 61/24; C08L 83/04
[52] U.S. Cl. .................. 260/29.4 R; 252/8.8; 260/29.2 M; 428/290
[58] Field of Search .................. 260/29.2 M, 29.2 TN, 260/29.4 R, 824 R; 252/8.8 R, 8.8 AF, 8.8 AK; 428/290

[56] References Cited

U.S. PATENT DOCUMENTS

| 2,891,920 | 6/1959 | Hyde et al. | 260/29.2 |
|---|---|---|---|
| 3,061,567 | 10/1962 | Keil | 260/29.2 |
| 3,294,725 | 12/1966 | Findlay et al. | 260/29.2 |
| 3,355,474 | 11/1967 | Wheeler, Jr. | 106/38.22 |
| 3,488,701 | 1/1970 | Herbes et al. | 252/8.8 R |
| 3,597,380 | 8/1971 | Bertini et al. | 260/29.4 R |
| 3,619,278 | 11/1971 | Ogawa | 117/139.5 A |
| 3,723,377 | 3/1973 | Spangler | 260/29.4 R |

OTHER PUBLICATIONS

Journal of the American Association of Textile Chemists and Colorists, vol. 4(1), Jan. 1972, pp. 14–15.

*Primary Examiner*—Theodore E. Pertilla
*Attorney, Agent, or Firm*—George A. Grindahl

[57] ABSTRACT

A homogeneous blend of a concentrated aqueous solution of a durable press resin and a concentrated aqueous emulsion of a hydroxyl-endblocked polydimethylsiloxane was found to be storage-stable and to possess improved resistance to skin over during atmospheric exposure. The preparation of the homogeneous blend and its subsequent dilution with water comprises an improved method for preparing a textile-treating composition.

13 Claims, No Drawings

4,167,501

PROCESS FOR PREPARING A TEXTILE-TREATING COMPOSITION AND RESIN-SILICONE COMPOSITIONS THEREFOR

BACKGROUND OF THE INVENTION

This invention relates to an improved method for preparing a textile-treating composition comprising a durable press resin and a silicone emulsion and to improved compositions useful therein. More particularly, this invention relates to a process comprising preparing a homogeneous blend of a concentrated aqueous solution of a durable press resin and a concentrated aqueous emulsion of a hydroxy-endblocked polydimethylsiloxane thereby improving the resistance of said aqueous emulsion to skin over during storage when exposed to the atmosphere, and thereafter preparing a textile-treating composition using the blend.

Herein, the concentrated aqueous solution of durable press resin may also be denoted as the concentrated resin solution and the concentrated aqueous emulsion of hydroxyl-endblocked polydimethylsiloxane may also be denoted as the concentrated silicone emulsion. A mixture of the concentrated resin solution and the concentrated silicone emulsion may also be denoted herein as the concentrated homogeneous resin-silicone blend.

Durable press resins and silicone compositions have been individually used for a long time to provide improved properties of textiles. In addition, to further improve the physical properties of textiles treated with durable press resins, silicone materials have been combined with durable press resins to soften the durable press resin and thereby provide improved hand, tear strength, and abrasion resistance of the treated textile. Specifically, Rooks has reported in the Journal of the American Association of Textile Chemists and Colorists 4(1), 14–15 (1972) that the addition of 1 percent of a silicone emulsion polymer to a textile-treating bath comprising a dimethyloldihydroxyethylene urea durable press resin served to fortify the durable press performance of a polyester/cellulose textile treated therewith.

Preparation of a textile-treating composition comprising a silicone component and a durable press resin is usually done immediately prior to its intended use using concentrated forms of the durable press resin and silicone component. Thus, a common method of preparing a textile-treating composition comprises adding a concentrated aqueous solution of a water-soluble durable press resin and a concentrated aqueous emulsion of a hydroxyl-endblocked polydimethylsiloxane, either sequentially or simultaneously, to a portion of water, preferably containing a surfactant, to provide a composition having suitable stability and proper dilution for applying to a textile. Preparing a textile-treating composition immediately prior to use, for example within 8 to 10 hours of its intended use, is necessitated by the fact that the completed bath also usually comprises catalysts and curing agents for the durable press resin and the silicone component, thereby rendering the rextile-treating composition unstable to long term storage. However, there are some disadvantages with this process.

A principal disadvantage with the above method for preparing a textile-treating composition is the tendency of the concentrated silicone emulsion to skin over when it is exposed to the evaporating action of the open atmosphere. This skin-over results in the formation of a semi-solid or solid layer of silicone polymer on the surface of the emulsion and on the sides of its container. A principal disadvantage of this skin-over is the tendency of this layer of semi-solid or solid polymer to be incorporated into the subsequently prepared textile-treating compositions as non-colloidal particles which interfer with the proper use of the textile-treating composition. It can be seen that a method of reducing or avoiding this skin-over would be advantageous, especially if the method were simple, effective, and economical.

Another disadvantage with the above method for preparing a textile-treating composition is the need to prepare, ship, store, inventory or otherwise handle the several individual components that are used in preparing the textile-treating compositions. It would be desirable to combine two or more of these individual components to form stable concentrated blends to facilitate and simplify said handling.

Yet another disadvantage with the above-mentioned method for preparing a textile-treating composition is the possibility for error and batch-to-batch variation when admixing several components "in the field"; that is, in the relatively less-sophisticated environment of the end-user. This possibility for error and batch-to-batch variation can be reduced by doing some of the mixing of components at the component manufacturer's and/or supplier's facility.

SUMMARY OF THE INVENTION

It is an object of this invention to provide a method for preparing improved silicone compositions which are useful for preparing textile-treating compositions and which are resistant to skin-over.

It is also an object of this invention to provide an improved process for preparing a textile-treating composition comprising a water-soluble durable press resin and a hydroxyl-endblocked polydimethylsiloxane.

These and other objects will be obvious to one of ordinary skill in the textile-treating arts upon considering the following disclosures and appended claims.

Briefly stated, the present invention provides an improved method for preparing a textile-treating composition comprising a water-soluble durable press resin and a hydroxyl-endblocked polydimethylsiloxane by premixing the appropriate amounts of a concentrated aqueous solution of a durable press resin and a concentrated aqueous emulsion of a hydroxyl-endblocked polydimethylsiloxane prior to preparing the textile-treating composition. The composition obtained by said premixing was found to have unexpected resistance to skin-over.

Because of the well-known tendency of concentrated hydroxyl-endblocked polydimethylsiloxane emulsions to break when mixed with polar materials such as alcohols and aqueous solutions of salts, and because of the long-standing practice in the textile-treating industry to mix the concentrated resin solution and concentrated silicone emulsion in additional water, preferably containing a surfactant, to avoid breaking the silicone emulsion, it was surprising that a concentrated resin solution and a concentrated silicone emulsion could be mixed to provide a storage-stable concentrated homogeneous resin-silicone blend.

It was also surprising to find that a concentrated silicone emulsion could be stabilized against skin-over during atmospheric exposure by admixing therewith a concentrated resin solution to provide a concentrated homogeneous resin-silicone blend having storage stability.

DESCRIPTION OF THE INVENTION

One aspect of this invention relates to a method for reducing the skin-over of a concentrated aqueous emulsion of a hydroxyl-endblocked polydimethylsiloxane, said method consisting of mixing with said concentrated aqueous emulsion at least an equal portion by weight of a concentrated aqueous solution of a durable press resin, thereby forming a concentrated, homogeneous resin-silicone blend which has increased resistance to skin-over when exposed to the atmosphere compared to the concentrated aqueous emulsion above.

Another aspect of this invention relates to an improved process for preparing a textile-treating composition comprising a dilute, homogeneous mixture obtained by mixing components comprising water, a concentrated aqueous solution of a durable press resin and a concentrated aqueous emulsion of a hydroxyl-endblocked polydimethylsiloxane, the improvement consisting of mixing the concentrated aqueous emulsion of a hydroxyl-endblocked polydimethylsiloxane with at least an equal portion by weight of the concentrated aqueous solution of a durable press resin, prior to admixing the water, to prepare said dilute, homogeneous mixture, thereby providing a concentrated, homogeneous resin-silicone blend and thereafter preparing the textile-treating composition using the concentrated, homogeneous resin-silicone blend.

Yet another aspect of this invention relates to a concentrated homogeneous resin-silicone blend having improved resistance to skin-over that is prepared by and used in the method of this invention.

By durable press resin it is meant herein any of the well-known resins that are used in the textile-treating art to impart to a cellulose-containing textile the ability to retain prepared creases and to resist the formation of additional creases. Examples of such resins include urea-formaldehyde resins, melamine-formaldehyde resins, dimethylolethylene urea resins, dimethylolpropylene urea resins, dimethyloldihydroxyethylene urea resins, methylolated glyoxaldiurein resins, dimethylol uron resins, dimethylolethyl triazone resins, methyloldimethyl hydantoin resins and dimethylol carbamate resins. It is well known that durable press resins may be simple compositions such as monomeric or dimeric molecules of well-defined structures, or they may be complex mixtures of polymeric molecules which may or may not contain monomeric species. It is also known that durable press resins may also contain varying trace amounts of precursor materials such as formaldehyde, urea, glyoxal and ammonia. It is to be understood that all of these various compositions containing said polymers, monomers and trace precursors are included in the general term of durable press resin as used herein.

Of particular interest for this invention are the durable press resins based on 1,3-bis(hydroxymethyl)-2-imidazolidinone, sometimes designated as DMEU resins or dimethylolethylene urea resins; 1,3-bis(hydroxymethyl)-4,5-dihydroxy-2-imidazolidinone, sometimes designated as DMDHEU resins or dimethyloldihydroxyethylene urea resins; and N,N-bis(hydroxymethyl)methoxyethyl carbamate resins. These durable press resins are of particular interest because of their ability to form concentrated homgeneous resin-silicone blends with any of the concentrated silicone emulsions hereinafter delineated.

The durable press resins which are suitable for use in the process of this invention are sufficiently water-soluble to permit the preparation of concentrated aqueous solutions thereof. By concentrated aqueous solutions it is meant herein solutions which contain at least 20 percent by weight, preferably from 35 to 50 percent by weight, of the durable press resin, based on the total weight of the concentrated resin solution. Durable press resins are commercially available as concentrated resin solutions or as solids, pastes and creams from which the concentrated resin solution may be prepared.

By hydroxyl-endblocked polydimethylsiloxanes it is meant herein polymers having the general formula $HO\{(CH_3)_2SiO\}_xH$ wherein x has an average value of from approximately 10 to approximately 1500 and corresponding to a polymer viscosity at 25° C. of approximately 0.03 to approximately 250 pascal-seconds (Pa.s). Hydroxyl-endblocked polydimethylsiloxanes having a viscosity of at least 10 preferably at least 50 Pa.s are of particular interest in the method of this invention because they provide a pleasing "hand" to fabrics treated therewith and because their concentrated aqueous emulsions are more likely to need stabilization against skin-over. While the general formula denotes a linear chain of dimethylsiloxane units which is endblocked with silicon-bonded hydroxyl groups, it is to be understood that there may be present therein trace amounts of other siloxane molecules such as cyclopolydimethylsiloxanes and branched polydimethylsiloxanes and other siloxane units such as monomethylsiloxane units, trimethylsiloxane units and methylhydroxylsiloxane units which may be present in commercial hydroxyl-endblocked polydimethylsiloxanes.

The concentrated silicone emulsion may be prepared by any suitable method such as by emulsion polymerization of a suitable lower-molecular-weight silicon-containing material or by the emulsification, by mechanical means, of a polydimethylsiloxane of suitable viscosity. It is only required that the resulting polydimethylsiloxane be endbklocked with silicon-bonded hydroxyl groups. By concentrated aqueous emulsions it is meant herein emulsions wherein the hydroxyl-endblocked polydimethylsiloxane is present in a concentration of at least 20 percent by weight, preferably from 35 to 50 percent by weight, based on the total weight of the concentrated silicone emulsion.

Of particular interest for this invention are the concentrated silicone emulsions that have been prepared by emulsion polymerization. Emulsion polymers suitable for use in this invention may be prepared according to the method of Hyde et al., U.S. Pat. No. 2,891,920 or the method of Findlay et al., U.S. Pat. No. 3,294,725, both patents hereby being incorporated herein by reference to show suitable methods for preparing concentrated silicone emulsions by emulsion polymerization. Concentrated silicone emulsions prepared by emulsion polymerization are of particular interest because of their ability to form concentrated homgeneous resin-silicone blends with concentrated solutions of any of the durable press resins, hereinbefore delineated.

In the method of this invention any concentrated resin solution and any concentrated silicone emulsion, each hereinbefore delineated, may be mixed in the proper weight-ratio using any suitable method such as by stirring, shearing and tumbling, provided that the resulting concentrated resin-silicone blend in homogeneous. By homogeneous it is meant any uniform state, such as a solution, emulsion or dispersion. By concentrated resin-silicone blend it is meant a composition wherein the total weight of durable press resin plus hydroxyl-endblocked polydimethylsiloxane comprises at least 20 percent by weight, preferably from 35 to 50 percent by weight of the total weight of concentrated resin solution plus concentrated silicone emulsion.

For every part by weight of concentrated silicone emulsion there is mixed therewith at least one part by weight of concentrated resin solution. It has been found that there is little or no improvement in the stability of the concentrated silicone emulsion towards skin-over during atmospheric exposure when less than an equal-weight portion of concentrated resin solution is mixed therewith.

It is often convenient to mix the concentrated silicone emulsion and the concentrated resin solution in the exact proportions that are needed for the subsequent preparation of a textile-treating composition; however, it is also possible to prepare a concentrated homogeneous resin-silicone blend which is richer-than-needed in one component and which can be further combined with an additional amount of the other component as desired. In the spirit of this invention, which is directed in part toward stabilizing a concentrated silicone emulsion against skin-over, it is the preferred mode of this invention to prepare a concentrated homogeneous resin-silicone blend which has sufficient or excess concentrated silicone emulsion for the subsequently prepared textile-treating composition. In this preferred mode, only concentrated resin solution may need to be stored for subsequent use in diluting the concentrated resin-silicone blend to the desired weight-ratio of concentrated resin solution and concentrated silicone emulsion.

A desirable textile-treating composition for use with 50/50 polyester/cotton fabric comprises a 5:1 weight ratio of concentrated resin solution to concentrated silicone emulsion. A concentrated resin-silicone blend of said weight ratio is therefore preferred. It has also been found that a concentrated homogeneous resin-silicone blend that has at least a 2:1 weight-ratio of concentrated resin solution to concentrated silicone emulsion has not only good resistance to skin-over but also good resistance to depositing solid polymer on the sides of its container. A preferred composition of this invention therefore is a concentrated homogeneous resin-silicone blend having a weight-ratio of concentrated resin solution to concentrated silicone emulsion of from 2:1 to 5:1, both inclusive. It should be noted that the weight-ratios of concentrated resin solution and concentrated silicone emulsion used herein refers to the weights of said concentrated emulsion and of said concentrated solution and not to the weights of resin and silicone per se.

The concentrated homogeneous resin-silicone blend of this invention may be used immediately to prepare a textile-treating composition or it may be transported and/or stored for up to 12 months or more as desired and subsequently used to prepare a textile-treating composition. In any event it is no longer necessary to store concentrated silicone emulsion for preparing these textile-treating compositions.

It is also within the scope of this invention to include in the concentrated homogeneous resin-silicone blend of this invention certain of the other components that are used to prepare a textile-treating compositions, as long as the blend or the textile-treating composition are not adversely affected. For example, it has been found advantageous to include a surfactant in the concentrated homogeneous resin-silicone blend, thereby adding further stability to the blend, facilitating the subsequent preparation of a textile-treating composition and further reducing the possibility of batch-to-batch variation and mixing errors "in the field." Any added surfactant should be compatible with the surfactant that was used to prepare the concentrated silicone emulsion. Well-known surfactants such as anionic, cationic and non-ionic surfactants may be suitably used.

A textile-treating composition may be prepared by the improved process of this invention, which uses the concentrated homogeneous resin-silicone blend of this invention, by mixing said blend with sufficient water to provide a bath of proper dilution in the well-known manner. A suitable surfactant may be included in the water or blend as desired. Curing catalysts, such as the well-known zinc and magnesium salts for the durable press resin and the well-known tin salts for the hydroxyl-endblocked polydimethylsiloxane, and crosslinking agents for the silicone, such as hydrolyzable silanes such as methyltrimethoxy silane may also be admixed, if desired, in the well-known manner. Typical textile-treating compositions that are prepared by this method comprise from 5 to 30, preferably from 10 to 20, percent by weight concentrated resin solution and from 1 to 6, preferably 2 to 4, percent by weight concentrated silicone emulsion, based on the total weight of the textile-treating composition. Conventional components, such as perfumes, colorants, blueing agents and optical brighteners, may also be included in the textile-treating composition, if desired.

The textile-treating compositions that are prepared by the method and composition of this invention essentially equivalent to analogous compositions prepared by the prior art method; however, their preparation is greatly simplified by the method and composition of this invention.

Now in order that those skilled in the art may better understand how the present invention may be practiced, the following examples are given by way of illustration and not by way of limitation. All parts, percentages and ratios are by weight unless otherwise specified. Viscosity was measured in centipoise and was converted to pascal-seconds by dividing by 1000. Tear strength was measured in pounds per inch and was converted to newtons per meter by multiplying by 175.1268 and rounding off.

EXAMPLE 1

A 40 percent emulsion of hydroxyl-endblocked polydimethylsiloxane was prepared by heating a homogenized mixture of 1070 parts of water, 71.2 parts of dodecylbenzenesulfonic acid and 950 parts of cyclopolydimethylsiloxanes at 80° C. for 4 hours. After being cooled, the emulsion was neutralized with 43.3 parts of triethanolamine in 83.6 parts of water and further mixed with 116 parts of octylphenoxypolyethoxy(40)ethanol in 30 parts of water. The emulsion had a pH of 7.7 and the hydroxyl-endblocked polydimethylsiloxane had a viscosity of 96.6 Pa.s at 25° C.

This polydimethylsiloxane emulsion was thoroughly mixed, in various weight ratios, with a 40 percent solution of 1,3-bis(hydroxymethyl)-4,5-dihydroxy-2-imidazolidinone (DMDHEU) in water, made by BI-Chem Division of Burlington Industries and denoted as Resin WNM. Certain of the resulting mixtures also contained additional surfactant, as indicated in Table I.

The resulting concentrated homogeneous resin-silicone blends, as well as the concentrated silicone emulsion only and the concentrated resin solution, were placed in separate open containers and exposed to the atmosphere for 5 days. At the end of 5 days the presence or absence of a skin on the surface of the mixture and build-up of solid deposit on the walls of the container were noted. The results, summarized in Table I, show the advantageous resistance of the compositions of this invention against skin-over. In addition, none of the tabulated mixtures of silicone emulsion and resin solution showed any separation at room temperature in a closed container.

TABLE I

| Blend Number | Ratio of Resin Solution to Silicone Emulsion | Atmospheric Exposure Results | |
|---|---|---|---|
| | | Skin-Over | Sidewall Deposit |
| 1 | 5 | None | Very little |
| 2 | 2 | None | Light to moderate |
| 3 | 1 | None | Heavy |
| 4[2] | 0.5 | Thick | Heavy |
| 5[1] | 5 | None | Trace |
| 6[1] | 2 | None | Moderate |
| 7[1] | 1 | None | Moderate to heavy |
| 8[1][2] | 0.5 | Thick | Heavy |
| 9[2] | Silicone emulsion only | Thick | Heavy |
| 10[2] | Resin solution only | None | Trace |

[1]Contains an additional 0.1 parts of octylphenoxypolyethoxy(40)ethanol per 1 part of silicone emulsion.
[2]For comparison purposes only.

EXAMPLE 2

Six concentrated aqueous solutions of various durable press resins were each mixed with one of three concentrated aqueous emulsions of various hydroxyl-endblocked polydimethylsiloxanes in a ratio of 5 parts of durable press resin solution to 1 part of polydimethylsiloxane emulsion. Fifty milliliters of each mixture were placed in 2 ounce containers and the closed containers were allowed to stand at room temperature for one week. The results of a visual clarity and compatibility test on these week-old samples are summarized in Table II. Note that not all combinations provide homogeneous resin-silicone blends. This example illustrates a simple test that can be used to determine such concentrated resin-silicone blends are homogeneous and therefore are within the scope of this invention.

In Table II the resin solutions and silicone emulsions are as follows.

Resin WNM—Burlington Industries trade name for a 40 percent solution of DMDHEU resin solution.
Protorez EU-50—Proctor Chemical trade name for a DMEU resin solution.
Stanset C-90—Standard Chemical trade name for a dimethylomethoxyethyl carbamate resin solution.
Protorez CHD—Proctor Chemical trade name for a dimethylolethyl carbamate resin solution.
Aerotex 23 Special—American Cyanamid trade name for a triazine-formaldehyde resin solution.
Resin MW—American Cyanamid trade name for a melamine-formaldehyde resin solution.
DC - 1111—Dow Corning trade name for a 40 percent emulsion of a hydroxyl-endblocked polydimethylsiloxane emulsion polymer having a viscosity of approximately 100 Pa.s.
DC - 347—Dow Corning trade name for a 60 percent emulsion of emulsified hydroxy-endblocked polydimethylsiloxane having a viscosity of 3 to 5 Pa.s.
DC - 27116—Dow Corning trade name for a 20 percent emulsion of emulsified hydroxyl-endblocked polydimethylsiloxane having a viscosity of 60 to 70 mPa.s.
UCC TE-24—Union Carbide trade name for a 20 percent emulsion of hydroxy-endblocked polydimethylsiloxane.

TABLE II

| | Silicone Emulsion[1] | | | |
|---|---|---|---|---|
| Resin Solution | DC 1111 | DC 347 | DC 27116 | UCC TE-24 |
| Resin WNM | H (hazy) | H (cloudy) | H (hazy) | H (cloudy) |
| Protorez EU-50 | H (hazy) | H (hazy) | H (hazy) | H (hazy) |
| Stanset C-90 | H (cloudy) | H (cloudy) | H (cloudy) | H (cloudy) |
| Protorez CHD | H (cloudy) | Incompatible | Incompatible | Incompatible |
| Aerotex 23 Special | H (hazy) | Incompatible | Incompatible | Incompatible |
| Resin MW | H (cloudy) | Incompatible | Incompatible | Incompatible |

[1]H denotes homogeneous and indicates a concentrated homogeneous resin-silicone blend of this invention.

EXAMPLE 3

Resin-silicone blend Number 5 of Example 1 was used to prepare two textile-treating compositions having the following compositions.

Composition 11 consisted of 12.0 parts of blend Number 5, 86.0 parts of water and 2.0 parts of an aqueous solution of MgCl$_2$ sold by Procter Chemical as Curite Mg.

Composition 12 consisted of 12.0 parts of blend Number 5, 85.6 parts of water, 2.0 parts of Curite Mg, 0.1 part of acetic acid, 0.1 part of methyltrimethoxy silane and 0.2 parts of an aqueous solution of dibutyltin-di(isooctylmercapto acetate) catalyst. U.S. Pat. No. 3,499,870 is hereby incorporated herein by reference to show the preparation of suitable tin catalysts.

Another portion of resin-silicone blend Number 5 of Example 1 was further concentrated to one half of its original volume by evaporation of water at 50° C. and the following two textile-treating compositions were prepared therefrom.

Composition 13 consisted of 6.0 parts of the partially devolatilized blend Number 5, 92.0 parts of water and 2.0 parts of Curite Mg.

Composition 14 consisted of 6.0 parts of the partially devolatilized blend Number 5, 91.6 parts of water, 2.0 parts of Curite Mg, 0.1 part of acetic acid, 0.1 part of methyltrimethoxy silane and 0.2 parts of the tin catalyst that was used in composition 12.

For comparison a textile-treating composition was prepared by the prior-art method and was designated Composition 15. This composition was prepared by mixing 10.0 parts of the concentrated resin solution that was used to prepare blend Number 5 and 85.6 parts of water. To this mixture was mixed 2.0 parts of the concentrated silicone emulsion that was used to prepare blend Number 5, 2.0 parts of Curite Mg, 0.1 part of acetic acid, 0.1 part of methyltrimethoxy silane and 0.2 part of the tin catalyst that was used in composition 12.

Compositions 11–15 were used to treat 50/50 polyester/cotton fabric samples by padding samples at 40 psi with one of the compositions and curing the padded samples at 350° F. for 5 minutes. Each fabric sample received approximately 0.5 percent silicone, based on the weight of the fabric.

Each sample was then washed five times (AATCC Test Method 124–1975) and tested for flat appearance (AATCC Test Method 124–1975), shrinkage (AATCC Test Method 135–1973) and tear strength (ASTM D2261-71). The samples treated with textile-treating compositions prepared by the method of this invention had essentially equivalent fill shrinkage, flat appearance and tear strength and slightly better warp shrinkage than the samples treated per the prior art.

TABLE III

| Composition Number | Flat Appearance | Shrinkage (%) | | Tear (N/m) | |
|---|---|---|---|---|---|
| | | Warp | Fill | Warp | Fill |
| 11 | 3.9 | 0.0 | 0.5 | 736 | 753 |
| 12 | 3.9 | 0.1 | 0.5 | 788 | 1033 |
| 13 | 3.9 | 0.3 | 0.5 | 823 | 893 |
| 14 | 3.9 | 0.1 | 0.5 | 753 | 911 |
| 15[(1)] | 3.8 | 0.5 | 0.6 | 893 | 963 |

[(1)]For comparison purposes only.

That which is claimed is:

1. A method for reducing the skin-over of a concentrated aqueous emulsion of a hydroxyl-endblocked polydimethylsiloxane, said method consisting of mixing at least an equal portion by weight of a concentrated aqueous solution of a durable press resin with said concentrated aqueous emulsion of a hydroxyl-endblocked polydimethylsiloxane, thereby forming a concentrated homogeneous resin-silicone blend which has increased resistance to skin-over when exposed to the atmosphere compared to the concentrated aqueous emulsion of a hydroxyl-endblocked polydimethylsiloxane.

2. A method according to claim 1 wherein the concentrated aqueous emulsion of hydroxyl-endblocked polydimethylsiloxane is prepared by emulsion polymerization of cyclopolydimethylsiloxanes.

3. A method according to claim 2 wherin the concentrated aqueous solution of a durable press resin is prepared from a durable press resin selected from the group consisting of 1,3-bis(hydroxymethyl)-2-imidazolidinone, 1,3-bis(hydroxymethyl)-4,5-dihydroxy-2-imidazolidinone and N,N-bis(hydroxymethyl)-methoxyethyl carbamate.

4. A method according to claim 3 wherein the weight ratio of concentrated aqueous solutions of durable press resin to concentrated aqueous emulsion of hydroxyl-endblocked polydimethylsiloxane has a value of from 2:1 to 5:1.

5. A homogeneous resin-silicone blend obtained by mixing one part by weight of a concentrated aqueous emulsion of a hydroxyl-endblocked polydimethylsiloxane and at least one part by weight of a concentrated aqueous solution of a durable press resin.

6. A composition according to claim 5 wherein the concentrated aqueous emulsion of a hydroxyl-endblocked polydimethylsiloxane is prepared by emulsion polymerization of cyclopolydimethylsiloxanes.

7. A composition according to claim 6 wherein the concentrated aqueous solution of a durable press resin is prepared from a durable press resin selected from the group consisting of 1,3-bis(hydroxymethyl)-2-imidazolidinone, 1,3-bis(hydroxymethyl)-4,5-dihydroxy-2-imidazolidinone and N,N-bis(hydroxymethyl)-methoxyethyl carbamate.

8. A composition according to claim 7 wherein the weight ratio of concentrated aqueous solution of durable press resin to concentrated aqueous emulsion of hydroxyl-endblocked polydimethylsiloxane has a value of from 2:1 to 5:1.

9. A composition according to claim 8 wherein a surfactant is admixed with the concentrated homogeneous resin-silicone blend.

10. In a process for preparing a textile-treating composition comprising a dilute, homogeneous mixture of water, a water-soluble durable press resin and an emulsified hydroxyl-endblocked polydimethylsiloxane, said process consisting essentially of the steps of mixing a concentrated aqueous solution of a durable press resin and a concentrated aqueous emulsion of a hydroxyl-endblocked polydimethylsiloxane with a water phase to provide and dilute, homogeneous mixture, the improvement consisting of mixing the concentrated aqueous emulsion of a hydroxyl-endblocked polydimethylsiloxane with at least an equal portion by weight of the concentrated aqueous solution of a durable press resin prior to preparing the dilute, homogeneous mixture, thereby providing a concentrated, homogeneous resin-silicone blend, and thereafter preparing the textile-treating composition using the concentrated, homogeneous resin-silicone blend.

11. A process according to claim 10 wherein the concentrated aqueous emulsion of a hydroxyl-endblocked polydimethylsiloxane is prepared by emulsion polymerization of cyclopolydimethylsiloxanes.

12. A process according to claim 11 wherein the concentrated aqueous solution of a durable press resin is prepared from a durable press resin selected from the group consisting of 1,3-bis(hydroxymethyl)-2-imidazolidinone, 1,3-bis(hydroxymethyl-4,5-dihydroxy-2-imidazolidinone and N,N-bis(hydroxymethyl)methoxyethyl carbamate.

13. A process according to claim 12 wherein a surfactant is admixed with the concentrated homogeneous resin-silicone blend.

* * * * *

UNITED STATES PATENT AND TRADEMARK OFFICE
CERTIFICATE OF CORRECTION

PATENT NO. : 4,167,501
DATED : September 11, 1979
INVENTOR(S) : Robert J. Rooks

It is certified that error appears in the above-identified patent and that said Letters Patent are hereby corrected as shown below:

In Column 1, line 59; the word "rextile" should read "textile".

In Column 9, line 42; the word "wherin" should read "wherein".

In Column 10, line 31; the line reading "provide and dilute, homogeneous mixture, the improve-" should read "provide said dilute, homogeneous mixture, the improve-".

In Column 10, line 49; the formula "1,3-bis(hydroxymethyl-4,5-dihydroxy-" should read "1,3-bis(hydroxymethyl)-4,5-dihydroxy-"

Signed and Sealed this

Eighth Day of September 1981

[SEAL]

Attest:

Attesting Officer

GERALD J. MOSSINGHOFF

Commissioner of Patents and Trademarks